L. C. BONELLI.
RESILIENT WHEEL.
APPLICATION FILED SEPT. 23, 1916.
1,264,765.
Patented Apr. 30, 1918.
2 SHEETS—SHEET 2.
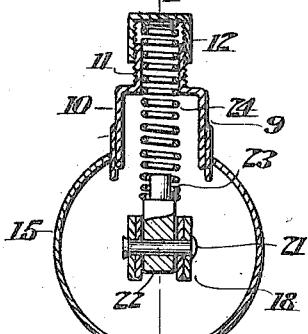
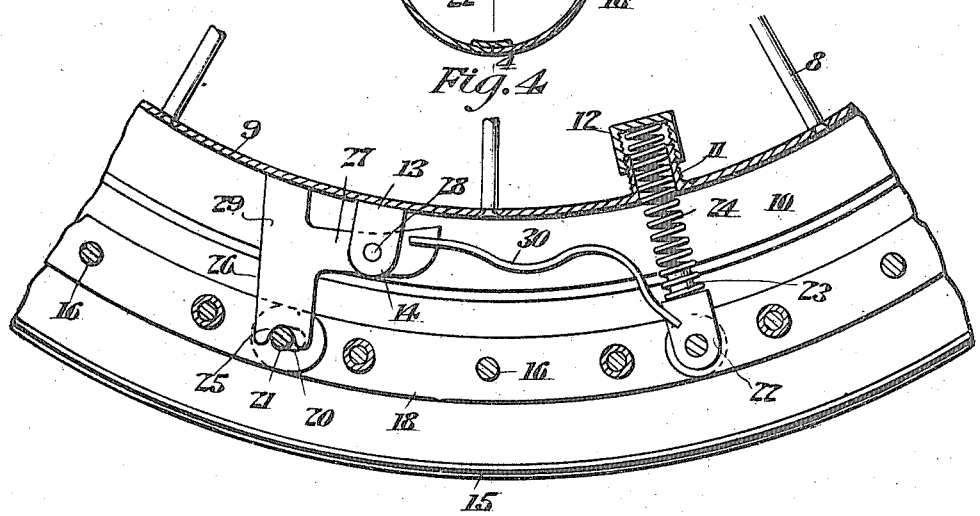
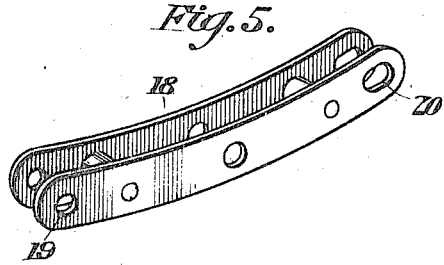
Witnesses
Inventor
L. C. Bonelli
By Victor J. Evans
Attorney

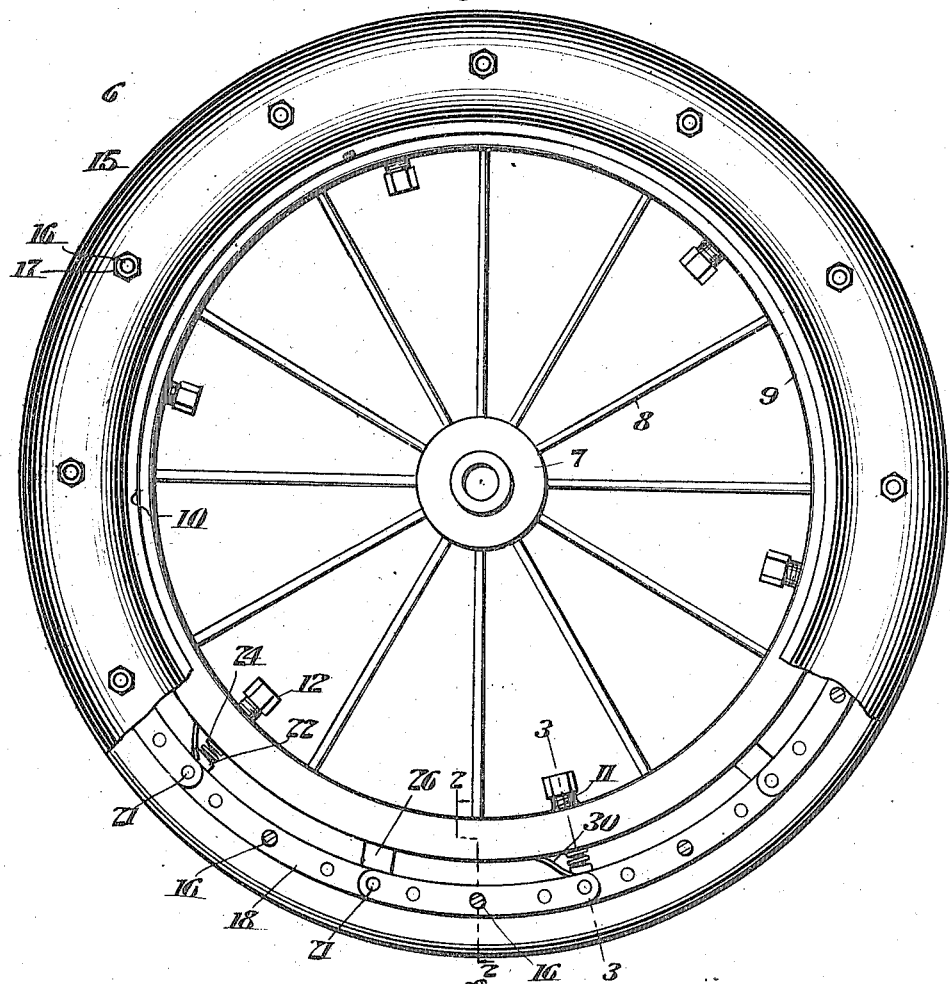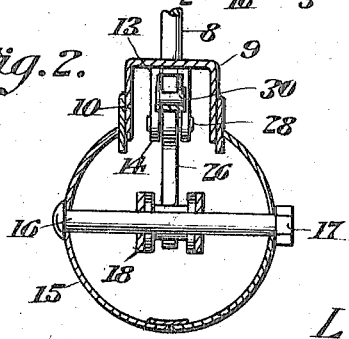

UNITED STATES PATENT OFFICE.

LIBORIO C. BONELLI, OF SAN ANTONIO, TEXAS.

RESILIENT WHEEL.

1,264,765. Specification of Letters Patent. Patented Apr. 30, 1918.

Application filed September 23, 1916. Serial No. 121,773.

*To all whom it may concern:*

Be it known that I, LIBORIO C. BONELLI, a subject of the King of Italy, residing at San Antonio, in the county of Bexar and State of Texas, have invented new and useful Improvements in Resilient Wheels, of which the following is a specification.

This invention relates to improvements in the construction of vehicle wheels, and the primary object thereof is to produce a metallic wheel which shall embody all of the resilient properties of a pneumatic wheel.

In carrying out the invention it is my purpose to construct a resilient wheel wherein the rim or felly is movable with relation to the tread or tire, means of a novel construction, and including resilient elements, being arranged between the said rim and tire whereby to permit of the yielding of the tire toward or away from the rim and also whereby to prevent the creeping of the tire around the rim.

It is also my purpose to produce a resilient wheel comprising a metallic tubular tire or tread having its inner face formed with a continuous opening to receive the flanged rim or felly of the wheel, and to arrange between the said tread and felly yieldable means for normally sustaining the said members in proper relation to each other, said means also preventing the creeping of the tread or tire around the rim or felly and being so positioned as to equally absorb any shock or jar to which the wheel may be subjected and as a consequence reduce the danger of breakage of the parts to a minimum and at the same time produce a spring wheel that is strong and efficient and wherein the rim and tread are yieldable with respect to each other in all directions.

It is a still further object of the invention to produce a metal wheel wherein the tread member is yieldably secured to the rim or felly; wherein the tension of the resilient means between the said rim and felly may be adjusted conveniently without separating the parts; wherein the tendency of the creeping of the tread around the felly is compensated for, and wherein the operative elements between the tread and felly are effectively protected against the accumulation of dust or dirt as well as against the entrance of moisture thereto.

It is a still further object of the invention to produce a metallic wheel in which the tire or tread is yieldable with respect to the rim or felly that shall be of a simple construction, cheaply and easily manufactured and which shall also embody great strength and durability.

With these and other objects in view, which will more fully appear as the nature of the invention is better understood, the same consists in the novel construction, combination and arrangement of parts hereinafter more fully described, illustrated and claimed.

The essential feature of the invention involved in the provision of the resilient metallic wheel, is necessarily susceptible to structural modifications without departing from the scope of the invention, but a satisfactory illustrative embodiment of the latter is shown by the accompanying drawings, in which:

Figure 1 is a side elevation of a resilient wheel constructed in accordance with the present invention, parts being broken away and parts being shown in section, Fig. 2 is a sectional view approximately on the line 2—2 of Fig. 1, Fig. 3 is a sectional view approximately on the line 3—3 of Fig. 1, Fig. 4 is a detail longitudinal sectional view approximately on the line 4—4 of Fig. 3, and Fig. 5 is a perspective view of one pair of the lever members employed in the construction.

Referring now to the drawings in detail the wheel, in its entirety, is broadly indicated by the numeral 6 and is preferably, but not necessarily, entirely constructed of metal.

The hub of the wheel, indicated by the numeral 7, has radiating therefrom the spokes 8 which connect the rim or felly 9 to the said hub. In the present instance the rim or felly 9 comprises an annulus formed with side flanges 10 extending outwardly therefrom and being arranged in parallelism, so that the rim or felly is substantially U-shaped in cross section. The rim 9, at determined intervals, approximately central between certain of the spokes 8, is provided with circular openings that are surrounded by sleeves 11, the said sleeves being formed with exterior threads that are engaged by interior threads of the cap members 12. The rim 9 upon its outer surface, and at a suitable distance away from the sleeves 11, is formed or otherwise provided with lugs 13, the same being disposed approximately centrally between the flanges 10 of the said rim, and the outer ends of these lugs are slotted forming the same each with a pair of spaced ears 14. The purpose of the foregoing described construction will presently be apparent.

The tire or tread member is indicated by the numeral 15, and in the construction illustrated by the drawings comprises two mating annular members each approximately semi-circular in cross section whereby, when the sections are assembled, the tread presents a member which is circular in cross section. In this connection it is to be stated that the tread may, if desired, be constructed from a single element and that the same may be of any cross sectional shape or formation desired. The tread in any event is provided, upon its inner periphery, with a central continuous opening to receive the flanges 10 of the rim 9, and the edges of the tread at the opening therein may be flanged inwardly to engage with the flanges of the rim. The frictional engagement between the rim and tread is at no time sufficient to prevent the free movement of these members toward or away from each other.

The hollow tread at points thereon which are arranged approximately centrally between the lugs 13 and the caps 12 of the rim, when the said rim is arranged upon the tread, is provided with transversely arranged alining openings through which pass bolt members 16, the threaded ends of the bolts being engaged by nuts 17. By this arrangement it will be noted that the edges provided by the opening in the tread may be brought toward or away from each other, if desired, but the bolts also serve as pivot or fulcrum members for the links 18 which are arranged within the tread. The links 18 are arranged in spaced pairs, suitably connected, and one of the bolts 16 passes centrally through each of such connected pairs of links. Each pair of links, at one of the ends thereof, is provided with alining rounded openings 19, and at their other ends with alining elongated openings 20. The elongated openings of each pair of links is brought to aline with the rounded openings in the adjacent pair of links, and pivot members 21 are passed through such registering openings to connect all of the links so that the series of connected links provide a substantially annular chain-like body. One series of pivots 21 are disposed diametrically opposite the openings in the rim surrounded by the sleeves 11 and this series of pivots has secured between the connected ends of the links block members 22 that are provided with inwardly extending studs 23, the said studs receiving each one end of a helical spring 24, each of the said springs having its other end passing through the openings surrounded by the sleeves 11. The cap members 12 receive the outer ends of the springs and the adjustment of the said caps regulates the tension of the springs, as will be readily understood. If desired any suitable means may be provided for locking the caps in an adjusted position with relation to the sleeves.

The pivots 21 at the ends of the links 18 opposite those engaging the blocks 22 are designed to receive the forked or slotted ends 25 of the anti-creeping members 26. The slots in the said ends 25 of the anti-creeping members 26 are of sufficient depth to prevent the member 26 becoming disengaged from the pivots 21 when the wheel is subjected to a sudden load or shock. Each of the members 26 comprises a substantially T-shaped element or lever, the central member or arm 27 thereof being arranged between the ears 14 of the lugs 13 and pivotally secured between the said ears, as indicated by the numeral 28, while one end of the angular arm 29 of the said lever is provided with the slot 25, and the other end of the said arm contacts with the outer periphery of the rim 9, as clearly illustrated in Fig. 4 of the drawings. The end of the arm 27 of the anti-creeping member 26 has secured thereto one end of a flat bowed spring 30, the opposite end of the said spring being secured to the block 22, and this spring is adapted to normally retain the forked or slotted end of the member 26 in engagement with the referred to pivot 21, and as a consequence the creeping of the tread around the rim will be compensated for and prevented, while at the same time the yielding action of the tread with relation to the rim or felly will not be interfered with.

By the particular and peculiar construction and arrangement of the parts as above described it will be noted that a yielding movement of the tread in either direction with respect to the rim will cause all of the links 18 to swing upon their pivotal connection with the bolts 16 and as a consequence the shock or jar incident to such movement of the rim will be equally distributed throughout. The creeping movement of the rim, as stated, is amply compensated for and effectively prevented, and the tension of the springs 24 may be nicely adjusted, and in view of the foregoing it is thought that the simplicity and advantages of the construction will be apparent without further detailed description.

Having thus described the invention, what I claim is:

1. In a resilient wheel, a flanged rim, a hollow tread surrounding the rim and having an opening to receive the flanges of the rim, and an endless chain member in the tread comprising a plurality of loosely connected pairs of links, pivot means passing transversely through the tread and centrally through each pair of links, spring means between one end of each pair of links and the rim, adjusting means for said spring means, and spring influenced pivoted means upon the rim co-engaging with the connecting members at the opposite ends of the links for holding the chain and tread against circumferential movement.

2. In a resilient wheel, a flanged rim provided with spaced openings having threaded sleeves surrounding the same, threaded caps for the sleeves, a hollow tread having an inner continuous opening receiving the flanges of the rim, a chain member arranged circumferentially within the tread and comprising a plurality of loosely connected pairs of links, pivot members arranged transversely of the tread and passing centrally through each pair of links, block members upon the connecting means at one of the ends of each pair of links, lugs upon the blocks, a spring upon each of the lugs and extending through the sleeves in the rim and engaged by the caps therefor, T-shaped levers pivotally secured to the rim and having each a slotted end to engage with the connecting member between the ends of the links opposite the ends engaged by the blocks, and a flat bowed spring between each of the blocks and the pivoted arm of each of the T-shaped levers.

In testimony whereof I affix my signature.

LIBORIO C. BONELLI.

Copies of this patent may be obtained for five cents each, by addressing the "Commissioner of Patents, Washington, D. C."